Nov. 14, 1961  J. J. BURNS  3,008,357
SAW SHARPENING TOOL
Filed Feb. 24, 1960  3 Sheets-Sheet 1

INVENTOR.
John J. Burns
BY
Victor J. Evans & Co.
ATTORNEYS

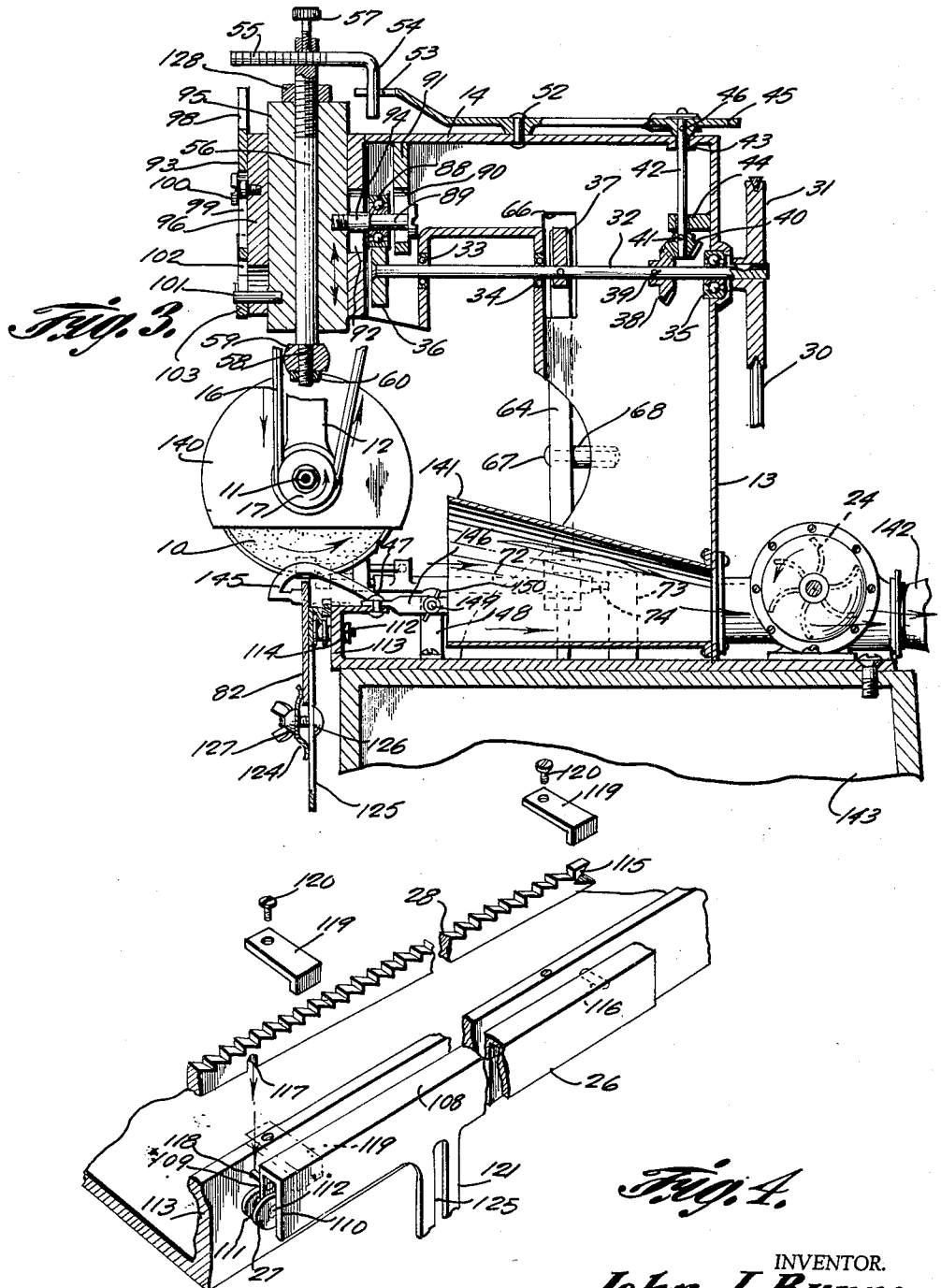

INVENTOR.
John J. Burns
BY
Victor J. Evans & Co.
ATTORNEYS

United States Patent Office 3,008,357
Patented Nov. 14, 1961

3,008,357
SAW SHARPENING TOOL
John J. Burns, 26 Church Lane, Portsmouth, R.I.
Filed Feb. 24, 1960, Ser. No. 10,663
4 Claims. (Cl. 76—41)

This invention relates to machine tools particularly of the type having a grinding wheel for cutting work clamped to a traveling bed of a machine and wherein the bed is advanced, step by step for positioning objects, such as the teeth of a saw, in the path of a grindwheel and wherein the grinding wheel, saw carriage, and other operating elements of the machine are actuated by a common motor.

The purpose of this invention is to provide a grinder for teeth of saws in which a grinding wheel reciprocates vertically as the saw is advanced.

Various types of saw setting and sharpening tools have been provided and although numerous types of tools have been used for manual operation it has been found difficult to grind the teeth of saws by mechanical or other power means. With this thought in mind this invention contemplates a grinding wheel carried by an arm suspended over a traveling work table or carriage, whereby with pawls mounted to co-act with the teeth of an index bar or saw for feeding the saw in relation to the grinding wheel absolute accuracy in spacing the saw teeth is obtained.

The object of this invention is, therefore, to provide a saw sharpening tool having a saw carried by a traveling carriage whereby with the saw positioned so that the teeth thereof receive a grinding wheel the teeth of the saw are accurately sharpened as the machine operates.

Another object of the invention is to provide a saw sharpening machine in which the pitch or travel of a saw carriage is adjustable to compensate for the pitch of teeth of a saw being sharpened.

Another important object of the invention is to provide a saw sharpening tool that is designed to sharpen both cross-cut and rip saws.

A further object of the invention is to provide a saw sharpening tool which is substantially automatic and which is of a relatively simple and economical construction.

With these and other objects and advantages in view the invention embodies a stand having an over-hanging arm mounted on a base plate, a carriage upon which the saw is clamped for sharpening slidably mounted on the stand, a grinding wheel adjustably mounted on the stand, means for feeding the carriage in relation to the grinding wheel in steps with the steps corresponding to the pitch of the saw, and means for operatively connecting the parts to a common motor.

Other features and advantages of the invention will appear from the following description taken in connection with the drawings, wherein:

FIGURE 3 is a longitudinal section through the machine showing the grinding wheel, saw, and operating elements, the parts being shown on an enlarged scale.

FIGURE 4 is a view showing a saw advancing carriage with the toothed ratchet bar on one side for advancing the saw the distance of one tooth at a time, the parts being shown in spaced relation and parts thereof being broken away.

Figures 1, 2:
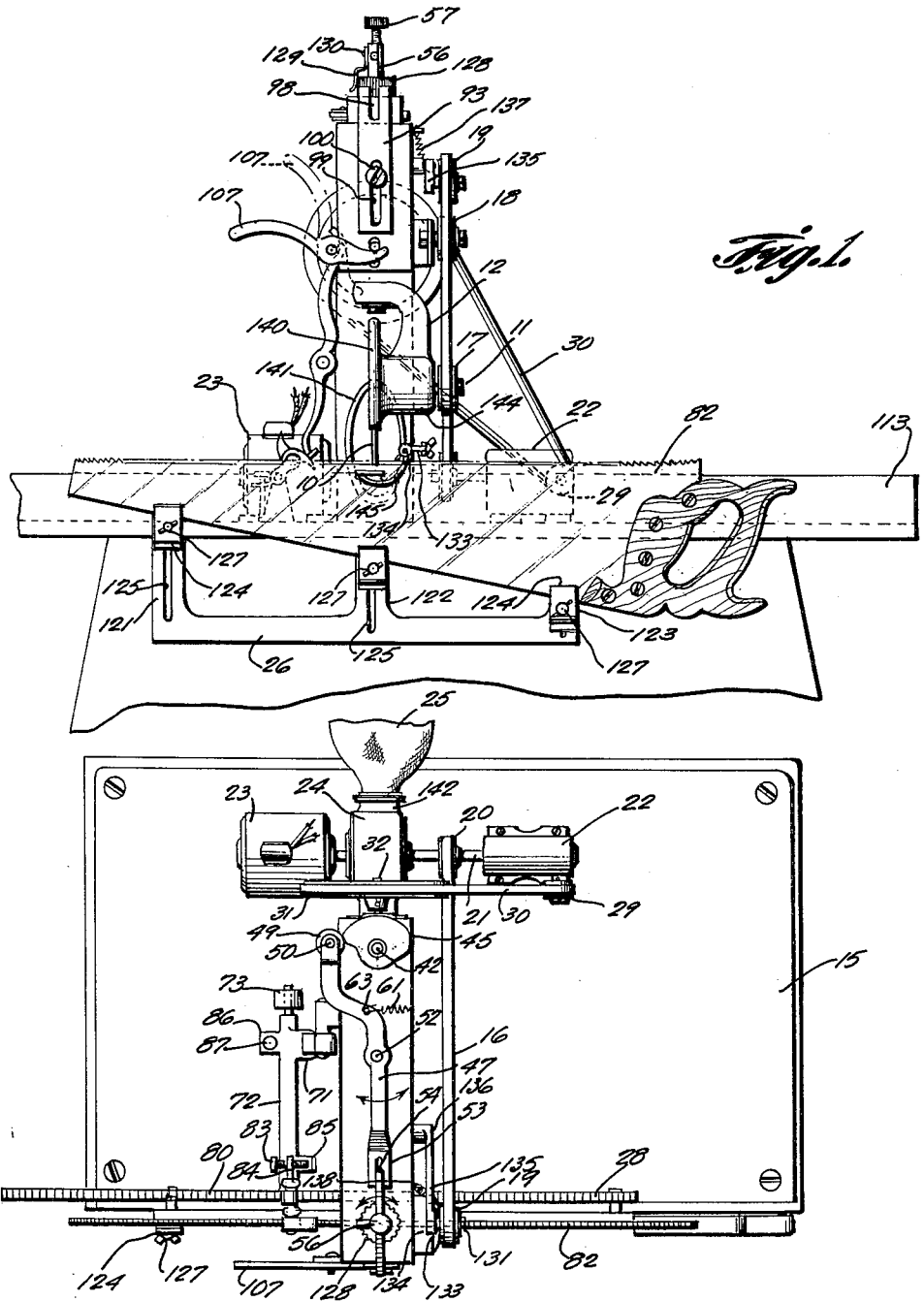
FIGURE 1 is a front elevational view of the saw sharpener showing a saw secured to a carriage of the machine and positioned whereby the teeth thereof receive a grinding wheel.
FIGURE 2 is a plan view of the saw sharpening machine with the parts as shown in FIGURE 1.

Referring now to the drawings wherein like reference characters denote corresponding parts the saw sharpening tool of this invention includes a grinding wheel 10, a spindle 11 rotatably mounted in a bracket 12, a stand having a vertically disposed section 13 and a horizontally disposed arm 14, a base plate 15 on which the section 13 of the stand is mounted, a belt 16 trained over a pulley 17 on the shaft 11, over pulleys 18 and 19 on the arm 14 and over a pulley 20 on a shaft 21 which extends from a gear reduction 22 and having a dust bag 25 extended therefrom and a carriage 26 mounted to travel on rollers 27 and having a gear rack 28 for feeding the carriage mounted thereon.

The gear reduction 22 is provided with a pulley 29 over which a belt 30 is trained, and the belt is also trained over a pulley 31 on a shaft 32 that is rotatably mounted in the stand by bearings 33, 34 and 35 and that is provided with cams 36 and 37 and a beveled gear 38. The gear 38 which is secured to the shaft 32 by a pin 39 meshes with a beveled pinion 40 secured by a pin 41 on the lower end of a vertically disposed shaft 42 rotatably mounted in bearings 43 and 44 and on the upper end of which a cam 45 is secured by a pin 46.

The cam 45 which actuates the beveling arm 47, is provided with a lobe 48 that engages a roller 49 rotatably mounted by a pin 50 in a bifurcated end 51 of the lever 47. The lever 47 is pivotally mounted by a pin 52 on the top panel 14 of the arm of the stand and the opposite end of the lever is provided with a fork 53 that straddles a vertically disposed section 54 of an L-shaped arm 55 close fitted in a hole in the upper end of a shaft 56 on the lower end of which the grinding wheel carrying arm 12 is secured. The upper end of the shaft 56 is provided with a thumb screw 57 that secures the arm 55 having graduations thereon in adjusted positions for desired beveling of teeth and the lower end is provided with a threaded stud 58 that is secured in a hub 59 of the arm 12 by a nut 60. Upon operation of the cam 45 the lever 47, which is held by a spring 61, one end 62 of which is secured to the top panel 14 and the opposite end of which is secured in an opening 63 is actuated whereby the roller 49 is resiliently held against the surface of the cam 45. In this movement the fork 53 turns the shaft 56 whereby the grinding wheel 10 is turned about the center of the shaft 56 to cut teeth on a bevel and the bevel of one tooth may be cut in one direction with the bevel of the next tooth cut in the opposite direction.

Figure 5:
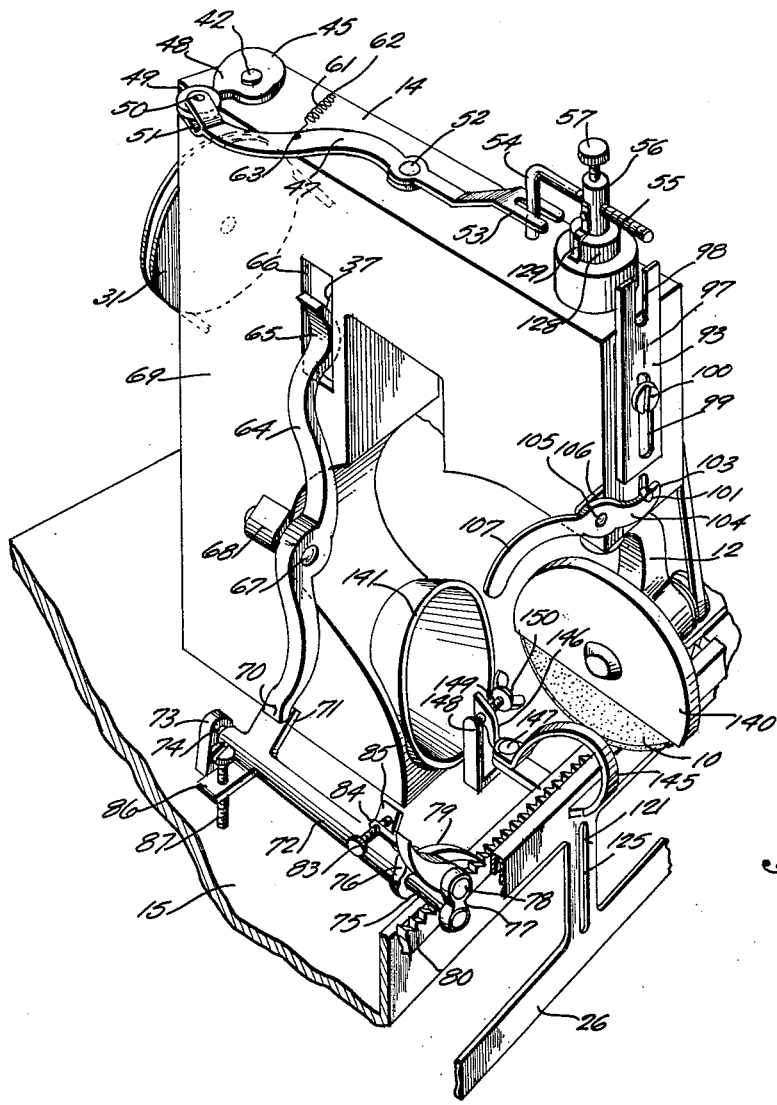
FIGURE 5 is a perspective view showing the saw sharpening tool and illustrating in particular the saw carriage advancing elements.
Figure 6:
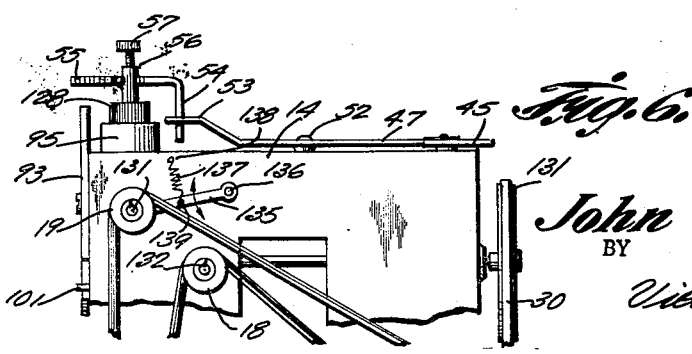
FIGURE 6 is a view illustrating a pair of sheaves over which the grinding wheel driving belt is trained.

The cam 37 on the shaft 32 is positioned to contact a feed lever 64, the upper end 65 of which extends through an opening 66 in the side wall of the stand and, as illustrated in FIGURE 5 the lever 64 is pivotally mounted by a pin 67 in a lug 68 on a side wall 69 of the stand. The lower end 70 of the feed lever 64 is positioned to engage a web 71 on a rod 72 which is pivotally mounted in bearings 73 on the base plate 15 by pins 74 and 75. The pin 75 is provided with links 76 and 77 by which a stub shaft 78 is operatively connected to the pin 75 and the shaft 78 is provided with a pawl 79 that is positioned to co-act with a feed rack 80 and a pawl 81 that is positioned to register with teeth of a saw 82. The positions of the pawls are adjusted by a thumb screw 83 threaded in an arm 84 extended from the shaft 78 and positioned to engage a web 85 extended from one side of the rod 72. The rod is also provided with a web 86 extended from the side opposite to the side from which the web 85 extends and the web 86 is provided with a thumb screw 87.

The cam 36, also positioned on the shaft 32, is positioned to travel on the outer race of a ball bearing 88 on a stud 89 extended through a slot 90 in an inner partition 91 in the stand and also through a slot 92 in a face plate 93 at the end of the stand. The portion of the stud 89 that is positioned in the slot 92 is provided with a sleeve 94 and, as illustrated in FIGURE 3, the end of the stud is threaded in a cylinder 95 which is vertically slidable in a head 96 at the end of the arm 14 of the stand. The cam 36 moves the cylinder 95 and grinding wheel carrying shaft 56 upwardly, similar to the movement of the needle bar of a sewing machine, with the cylinder and wheel dropping downwardly by gravity and moved upwardly by the cam.

The face 93 of the head of the arm 14 is provided with a slotted plate 97 having a slot 98 with an open upper end for receiving the bracket 55 when using the machine for sharpening rip saws and a slot 99 in the opposite end which provides a guide with a screw 100 extended through slot and threaded in the head 96 of the machine.

The lower end of the cylinder 95 is provided with a stud 101 that extends through a slot 102 in the face 93 and the stud 101 is positioned to be engaged by an end 103 of a lever 104 pivotally mounted by a pin 105 in a bearing 106 of the head of the stand and the opposite end 107 of the lever is extended for manual operation of the cylinder 95 and wheel 10 whereby the wheel may be elevated above teeth of a saw.

The machine is provided with a saw carriage 26 that is of inverted U-shape in cross-section having an upper end web 108 with an inner flange 109 and an outer flange 110 and, as illustrated in FIGURE 4, the flange 109 is positioned to travel on rollers 111 mounted by pins 112 on a table rail 113 extended upwardly from the base plate 15. The pins 112 are secured to the table rail by nuts 114.

The index bar 28 is provided with a V-shaped notch 115 that is positioned to receive a pin 116 extended from the saw carriage and the bar is also provided with notches 117 that are positioned to receive pins 118 also extended from the table rail. Clips 119, secured to the upper edge of the table rail 113 by screws 120 extend over the upper edge of the carriage, as shown in broken lines in FIGURE 4.

The carriage 26 includes a lower rail from which arms 121, 122 and 123, extend and the arms are provided with clamps 124 that are secured in slots 125 thereof by bolts 126 and wing-nuts 127.

The upper end of the grinding wheel spindle or shaft 56 is provided with a knurled wheel 128 by which the spindle and saw may be set for cross-cut saws, rip saws and hand saws and by this means the depth of the tooth gullets may be adjusted. The knurled disc or wheel 128 is retained in adjusted positions by a spring arm 129, the upper end of which is secured to the spindle 56 by a rivet or other fastener 130, as shown in FIGURE 1.

The belt 16, which is trained over the pulley 20 on the motor and reduction shaft 21 is also trained over the pulleys 18 and 19 which are pivotally mounted on pins 131 and 132 on the side of the stand. The shaft or pin 131 is secured in a bracket 133 by a nut 134 and the pin 132 on which the pulley 19 is mounted is carried in the extended end of an arm 135 which is pivotally mounted by a pin 136 on the stand and which is urged upwardly by a spring 137, the upper end of which is mounted by a pin 138 on the side of the stand and the opposite end 139 of which is secured to the arm 135.

The grinding wheel 10 is provided with a shield 140 and, as illustrated in FIGURE 3 dust from the grinding wheel is drawn by the blower 24 through the hood 141 and discharged through a connection 142 to a dust bag or the like.

The base plate 15 may be positioned on a table stand 143.

The bracket or arm 12, which carries the grinding wheel is provided with a hub 144 in which the shaft 11 on which the grinding wheel and pulley 17 are positioned is rotatably mounted.

The grinding wheel may be set to cut straight across a saw or to grind the teeth on a bevel and the amount of bevel may be increased or decreased, simply by releasing the thumb screw 57 and sliding the L-shaped rod 54. Pushing the rod rearwardly produces the angle or bevel and sliding the rod outwardly increases the angle or bevel. The leverage or throw is set by the position of the arm.

The saw is automatically fed through the machine and for index bar feeding the feed pawl 79 is used, coacting with the index bar 80 and for tooth feeding the pawl 81 is used. This provides a two pawl system which increases accuracy.

Operation

With the parts assembled as illustrated and described a saw, such as the saw 82 is secured by the clamps 124 to the saw carriage 26 and with the teeth cut straight across the saw the grinding wheel 10 is raised and lowered by the cam 36 and the cams are positioned whereby with the grinding wheel above the teeth of the saw the feed lever 64 is actuated by the cam 37 whereby one of the pawls engages the teeth of the index bar 28, or the teeth of the saw, advancing the saw a distance equal to the pitch of the teeth thereof and with the saw advanced the distance equal to the pitch of a tooth the grinding wheel is again lowered grinding a tooth of the saw.

The two pawls 79 and 81 provide a two pawl feeding system, the pawl 79 providing means for feeding from an index bar or graduated scale, and the pawl 81 providing means for advancing a saw as teeth thereof are ground; and whereby the teeth are accurately spaced in relation to the teeth of the saw.

Where the teeth are beveled the bevel gears 38 and 40 actuate the cam 45 which moves the lever 47 and the L-shaped bar 55 whereby the grinding wheel is moved to an inclined or beveled position with the result that the teeth are ground with beveled surfaces.

The machine is designed for sharpening saws of different types, and, as illustrated in FIGURE 5, the machine may also be provided with a gripping finger 145 that is the outside clamp for holding a saw in a stationary position while the grinding wheel is in contact with the saw teeth, whereby the saw is clamped in position and cannot move until grinding wheel starts upward. The finger clamp 145 is connected to a link 146 by a pin 147 and the link is secured to a bracket 148 by a bolt 149 on which a thumb nut 150 is provided.

With the parts arranged in this manner the tool or machine may be used for sharpening cross-cut saws, hand saws, rip saws, and the like and the pawls 79 and 81 are readily adjustable to saw of different pitch.

It will be understood that modifications, within the scope of the appended claims, may be made in the design and arrangement of the parts without departing from the spirit of the invention.

What is claimed is:

1. In a saw sharpener, the combination which comprises a vertically disposed stand extended upwardly from a base plate and having a horizontally disposed arm on the upper end, a saw carriage mounted to travel on said stand, clamping means on the carriage for retaining a saw in sharpening positions thereon, a head on the extended end of the arm, mounting means for supporting a grinding wheel in the head, a cylinder mounted for vertical sliding motion in said head, a vertically disposed shaft in said cylinder, a bracket secured to said shaft, a horizontally disposed shaft for receiving said grinding wheel thereon mounted for rotation in said bracket, a shaft mounted for rotation in said stand, a first cam on one end of said shaft adjacent said head, a roller mounted for rotation on said cylinder, said roller adapted to be engaged by said cam whereby the cylinder is reciprocated and said grinding wheel reciprocates vertically in the head, a shaft rotatably mounted in the stand and head, a pulley mounted on the opposite end of the shaft and positioned adjacent the head for actuating the cam to move the grinding wheel vertically, a second cam mounted on the shaft and positioned in the stand for operating saw actuating means whereby the saw is advanced the pitch of a tooth thereof with each movement, a lever pivotally mounted on the arm, and means actuated by the shaft for operating the lever to turn the mounting of the grinding wheel to correspond with the bevel of saw teeth.

2. In a saw sharpener, the combination which comprises a vertically disposed stand extended upwardly from a base plate and having a horizontally disposed arm on the upper end, a saw carriage mounted to travel on said stand, clamping means on the carriage for retaining a saw in sharpening position thereon, a head on the extended end of the arm, mounting means for supporting a grinding wheel in the head, a cylinder mounted for vertical sliding movement in said head, a vertically disposed shaft in said cylinder, a bracket secured to said shaft, a horizontally disposed shaft for receiving said grinding wheel mounted for rotation in said bracket, a shaft mounted for rotation in said stand, a first cam on one end of said shaft adjacent said head, a roller mounted for rotation on said cylinder, said roller adapted to be engaged by said cam whereby the cylinder is reciprocated and said grinding wheel reciprocates vertically in the head, a pulley mounted on the opposite end of the shaft and positioned adjacent the head for actuating the cam to move the grinding wheel vertically, a second cam mounted on the shaft and positioned in the stand for operating saw actuating means whereby the saw is advanced the pitch of a tooth thereof with each movement, a lever pivotally mounted on the arm, means actuated by the shaft for operating the lever to turn the mounting of the grinding wheel to correspond with the bevel of saw teeth, and a blower mounted on the stand for drawing grinding dust from the grinding wheel and discharging said dust into a dust collecting bag.

3. In a saw sharpener, the combination which comprises a base plate, a stand having a horizontally disposed arm on the upper end extended upwardly from said base plate, a saw carrying carriage mounted to travel on said base plate, clamping means for retaining a saw in sharpening positions on said carriage, a vertically disposed spindle mounted to travel vertically in said head, means for mounting a grinding wheel on the lower end of the spindle with the wheel positioned to engage saw teeth of a saw clamped on said carriage, a roller mounted for rotation on said head, a shaft rotatably mounted on the stand and head, a cam on the shaft and positioned to engage the cam to reciprocate the head vertically, a beveled gear on the shaft and operatively connected to the spindle for turning the spindle whereby the grinding wheel is actuated to correspond with the bevel of saw teeth, a cam on the shaft and positioned in the stand for actuating feeding means for advancing the saw carriage in relation to the grinding wheel, a blower mounted on the stand and having a hood positioned to receive grindings from the grinding wheel, said blower being positioned to discharge the grindings into a dust bag, a motor, and means operatively connecting the motor to the operating parts of the machine.

4. In a saw sharpener, the combination which comprises a vertically disposed stand extended upwardly from a base plate and having a horizontally disposed arm on the upper end, a saw carriage mounted to travel on said stand, clamping means on the carriage for retaining a saw in sharpening positions, a saw clamped on the carriage, an index bar positioned on the carriage and spaced from the saw, a head on the extended end of the horizontally disposed arm, a cylinder mounted in said head, a shaft mounted in said cylinder, a bracket on the end of said shaft for supporting a grinding wheel in the head whereby the grinding wheel reciprocates vertically on said head, a roller mounted for rotation on said cylinder, a shaft rotatably mounted in the stand and head, a cam mounted on the shaft and positioned in the head for engagement with said roller for actuating the grinding wheel vertically, a cam mounted on the shaft and positioned in the stand for operating saw actuating means whereby the saw is advanced, selectively, the pitch of a tooth of the saw clamped on the carriage or the pitch of a tooth on the index bar positioned on the carriage with each movement of said saw actuating means, a lever pivotally mounted on the arm, and means actuated by the shaft for operating the lever to turn the mounting of the grinding wheel to correspond with the bevel of the teeth of the saw.

References Cited in the file of this patent

UNITED STATES PATENTS

| | | |
|---|---|---|
| 2,519,735 | Boutin | Aug. 22, 1950 |
| 2,590,992 | McEwan | Apr. 1, 1952 |
| 2,835,146 | Vollmer | May 20, 1958 |
| 2,842,983 | Renie et al. | July 15, 1958 |